Aug. 21, 1956  D. M. MANNING  2,759,737
VERTICALLY ADJUSTABLE TRUCK TRAILER
Filed Dec. 29, 1953  4 Sheets-Sheet 1
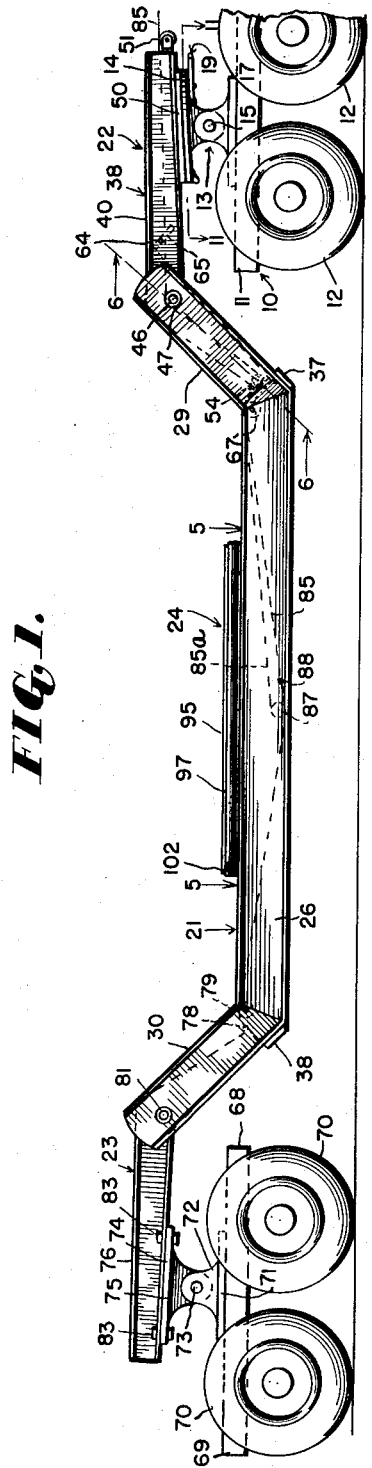
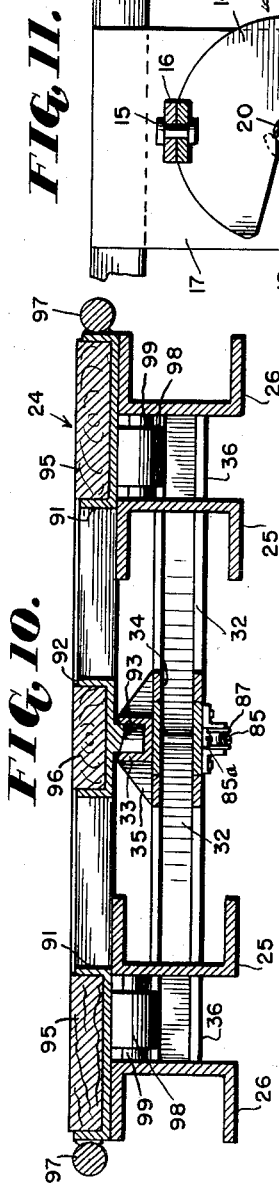
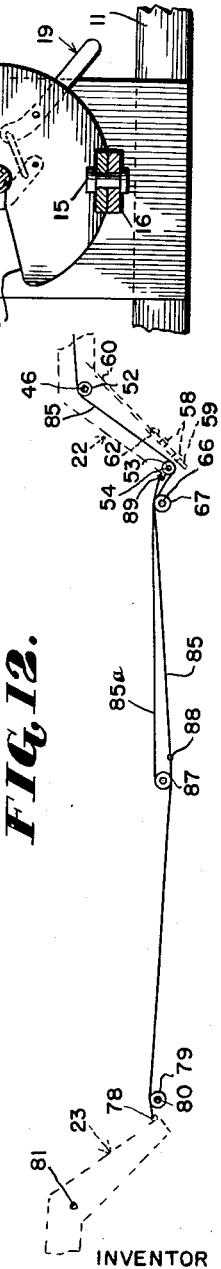
INVENTOR
DAVE M. MANNING
BY George L. Porter
ATTORNEY

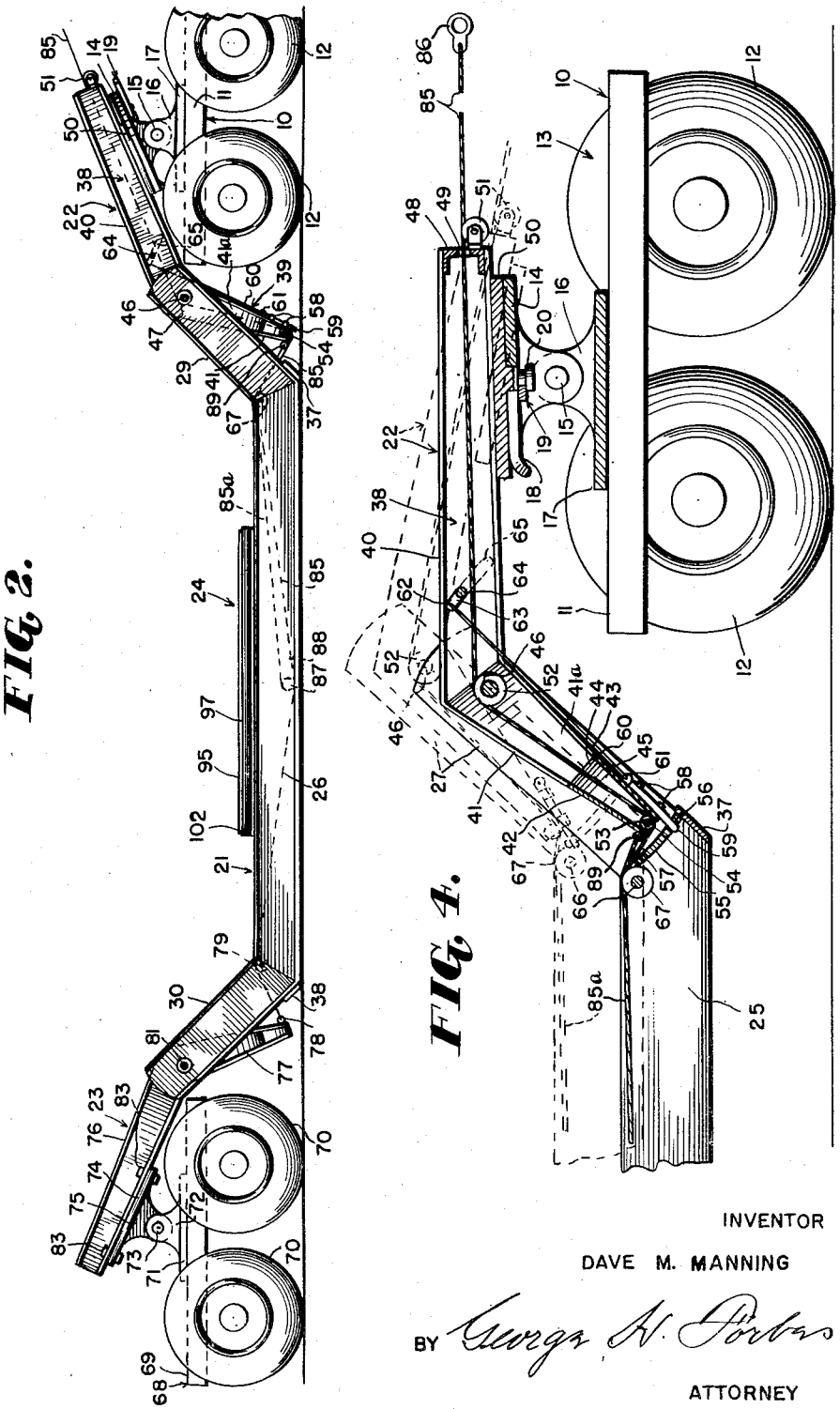

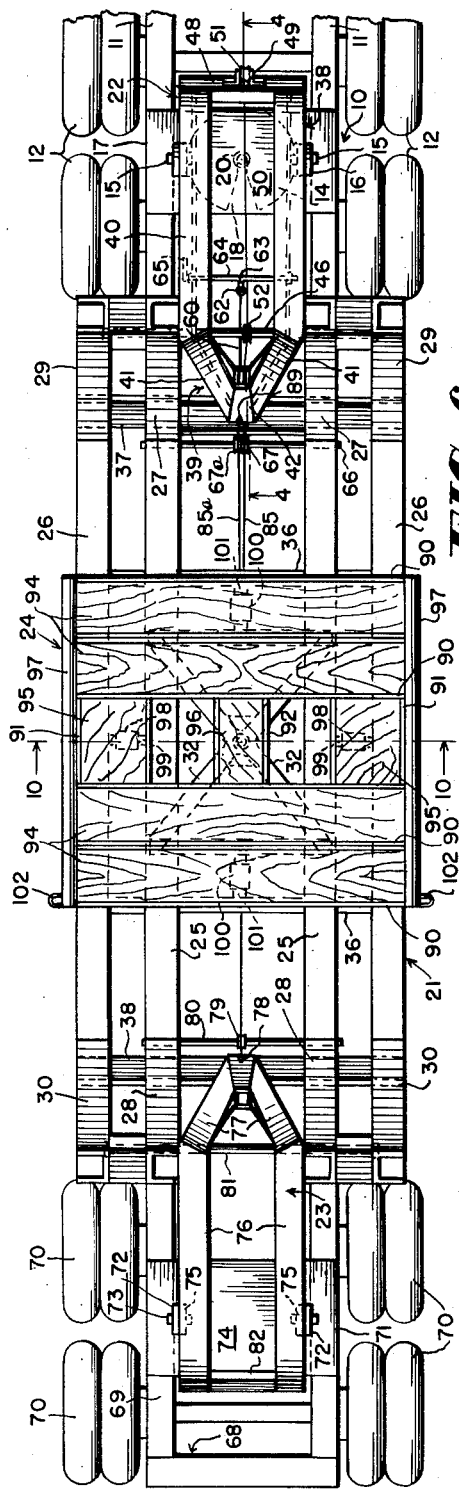

Aug. 21, 1956
D. M. MANNING
2,759,737
VERTICALLY ADJUSTABLE TRUCK TRAILER
Filed Dec. 29, 1953
4 Sheets-Sheet 4
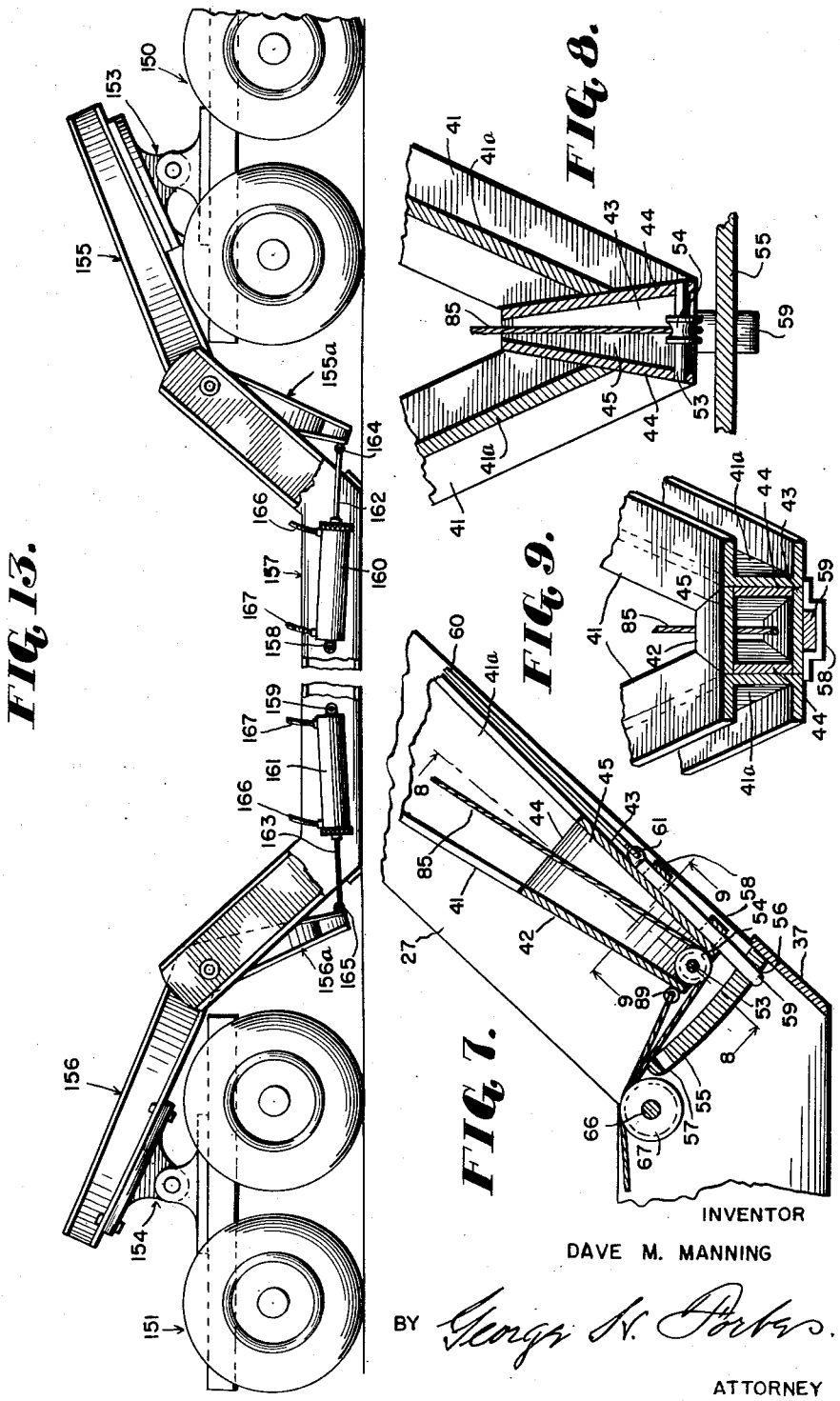
INVENTOR
DAVE M. MANNING
BY
ATTORNEY United States Patent Office 2,759,737
Patented Aug. 21, 1956

2,759,737

VERTICALLY ADJUSTABLE TRUCK TRAILER

Dave M. Manning, Hysham, Mont.

Application December 29, 1953, Serial No. 401,008

10 Claims. (Cl. 280—44)

This invention relates generally to the class of wheeled vehicles and is directed particularly to improvements in truck trailers.

The present invention deals with heavy hauling equipment and constitutes an improvement over the construction disclosed in my prior Patent No. 2,653,827 of September 29, 1953.

In the prior patent above referred to, there is disclosed a construction embodying an elongate frame body of substantial width having upwardly angled arms at its two ends and carrying a rotatable platform at the center thereof. The upwardly extending arms at the ends of the flat body are pivotally connected at their ends with and intermediate the ends of longitudinally extending beams which are oscillatable in a vertical plane on axes extending transversely of the structure. The beams at the rear end of the structure are secured for rocking movement on a transverse axis to a wheeled support and the beams at the forward end of the structure are pivotally attached at their forward ends, for rocking movement in a vertical plane on a transverse axis, with a motor driven tractor truck structure, by a fifth wheel connection whereby the tractor truck structure can turn with respect to the trailer structure. In this prior construction, fluid operated thrust units are carried by the load carrier and are connected by piston rods with the rear ends of adjacent beams whereby an upthrust may be applied to the rear ends of the beams to effect the raising of the load carrier from the ground.

An object of the present invention is to provide in a construction employing the elongate load carrier, an improved beam connection between each end of the load carrier and a wheeled truck, together with a novel cable system whereby, by the employment of a winch upon one wheeled truck which is a power driven tractor truck, the said beams may be simultaneously oscillated to effect the raising of the load carrier therebetween.

Another object of the invention is to provide in a construction of the character stated, a means whereby a single cable connected at one end with a winch carried upon the motor driven tractor truck is connected with the pivoted beams of the load carrier in a novel manner whereby to effect the oscillation of the beams on the wheeled trucks to elevate the load carrier when the cable is wound up on the winch.

A further object of the invention is to provide in a construction of the above described character, a novel and improved means for locking together the central or platform supporting portion of the load carrier and the beam structure at one end thereof when the load carrier is raised from the ground in order to support the carrier in such raised position for traveling.

Other objects and advantages of the invention will become apparent as the description of the same proceeds and the invention will be best understood from a consideration of the following detailed description taken in connection with the accompanying drawings forming a part of the specification, with the understanding that the invention is not defined to a strict conformity with the showing of the drawings but may be changed or modified within the scope of the appended claims.

In the drawings:

Fig. 1 is a view in side elevation of the trailer truck structure of the present invention showing the load carrier elevated from the ground or in traveling position.

Fig. 2 is a view corresponding to Fig. 1 but showing the load carrier in its lowermost position where it rests upon the ground.

Fig. 3 is a view in top plan of the structure.

Fig. 4 is a sectional view taken in a vertical plane substantially on the line 4—4 of Fig. 3 and upon an enlarged scale, with the load carrier elevated to its traveling position and showing in dotted outline the maximum elevated position to which the load carrier can be moved.

Fig. 5 is a horizontal section taken substantially on the line 5—5 of Fig. 1.

Fig. 6 is a sectional view taken substantially on the line 6—6 of Fig. 1 showing the parts on an enlarged scale.

Fig. 7 is a vertical section taken in a plane extending longitudinally of the center of the vehicle and on an enlarged scale, of the locking mechanism between the forward end of the central unit and the suspension beam unit.

Fig. 8 is a sectional view taken substantially on the line 8—8 of Fig. 7.

Fig. 9 is a sectional view taken substantially on the line 9—9 of Fig. 7.

Fig. 10 is a sectional view taken transversely of the central unit substantially on the line 10—10 of Fig. 3.

Fig. 11 is a sectional view taken substantially on the line 11—11 of Fig. 1.

Fig. 12 is a view illustrating diagrammatically the arrangement of the operating cable and pulleys.

Fig. 13 is a view in side elevation, with parts broken away, of a modified construction employing fluid operated pistons for raising and lowering the trailer structure.

Referring now more particularly to the drawings the numeral 10 generally designates the rear end portion of a motor driven tractor truck with which the present trailer truck structure is designed to be connected. The rear end of the chassis frame of this tractor truck is designated 11 and the supporting wheels are designated 12.

The present improved trailer structure is designed for connection with a tractor truck equipped with a winch, operated by suitable transmission gearing connected with the tractor truck engine. Tractor trucks equipped with this apparatus for winding up cables for the performance of various types of work are of standard well-known construction and accordingly the illustration of the same is not believed to be necessary to a proper understanding of the present invention.

Such conventional tractor trucks are equipped with or have pivotally supported on the chassis frame 11 thereof, a fifth wheel unit which is generally designated 13 and which, as shown in Fig. 11, comprises a plate 14 which is mounted upon trunnions 15 for rocking movement on an axis extending transversely of the chassis frame, the trunnions being supported in bearings 16 which are carried by and stand up from a platform or plate 17 forming a part of the chassis.

The fifth wheel plate 14 has the conventional rearwardly opening slot 18 and carries a suitable locking means, generally designated 19, for securing in the inner end of the slot, which is at the center of the disc plate 14 and upon the longitudinal center of the tractor truck, a fifth wheel pin or king pin 20 which is carried by and forms a part of the attached trailer structure, about to be described.

The trailer structure of the present invention comprises three main units which are, the central load carrier unit which is generally designated 21, the front or forward rock frame unit which is generally designated 22 and the back or rear rock frame unit which is generally designated 23.

The central load carrier unit is here illustrated as being in the form of a skeleton platform having at its center a turntable unit generally designated 24, but it is to be understood that such central unit may also be of any other form or construction necessary to suit the character of the load or material to be transported.

The central load carrier unit is preferably made up of four longitudinally extending beams arranged in spaced parallel relation. These are shown as comprising the two inner spaced parallel beams 25 and the two outer or bordering beams 26 each of which is disposed at the outer side of a beam 25 and spaced therefrom as shown in Fig. 3.

The inner beams 25 at their forward ends are continued upwardly at a desired inclination, here shown as approximately 45 degrees, in the form of arms 27 while the rear ends of such beams are also extended upwardly and rearwardly at the same inclination forming the rear arms 28.

The forward ends of the outer beams 26 are likewise continued forwardly and upwardly to provide the arms 29 and the rear ends of the outer beams 26 are continued upwardly and rearwardly forming the inclined arms 30.

The arms 27 and 29 are in spaced parallel relation and the arms 28 and 30 are likewise in spaced parallel relation as shown in Fig. 3.

While the beams 25 and 26 and the arms at the ends thereof may be formed of girders of any suitable cross-sectional form, they are here shown as channel irons having the flanges of the adjacent beams 25 and 26 oppositely directed in accordance with the showing of Fig. 10.

As is also shown in Fig. 10 and in Fig. 3, the inner beams 25 are joined together by cross beams 31 and diagonal intersecting beams 32. On the intersecting centers of the diagonal beams 32, is supported the fixed upwardly opening bearing socket 33 as shown in Fig. 10, for the purpose of supporting the turntable unit 24, which is hereinafter described in detail.

For further reinforcing the diagonal beams 32, plates 34 may be inset in the angles between the beams and the socket bearing may also be strengthened by the employment of the triangular buttressing webs 35 as shown in Figs. 5 and 10.

At suitable locations on opposite sides of the beams 31 additional reinforcing transverse beams 36 are provided which couple together the adjacent longitudinal beams 25 and the outside beams 26 and extending across the under faces of the arms 27 and 29 at the front of the load carrying unit and across the under faces of the arms 28 and 30 at the rear of the load carrying unit are reinforcing plates 37 and 38 respectively.

The front rock frame unit 22 is in the form of an elongate bell crank which comprises a long leg 38 and a short obliquely angled leg 39. The long leg is comprised of the two spaced parallel beams 40 which join with the angularly extending convergent shorter beams 41 which together make up the short leg 39 and the convergent ends of the shorter beams 41 are connected by the top and bottom transverse plates 42 and 43 respectively. These top and bottom plates are in turn joined together by the spaced longitudinally directed vertical side plates 44. The beams 40 and 41 are here shown as of "I" cross-sectional form and as shown in Fig. 8, the vertical longitudinally extending side plates 44 extend across the web portions 41a of the convergent means 41 and thus form with the top and bottom plate transverse plates 42 and 43, a box 45 as shown in Figs. 7 and 9.

As is also shown in the several figures, the convergent beams 41 forming the short leg 39 of the front rock frame unit, are preferably of decreasing height.

The unit 22 is located between the upper ends of the forward arms 27 and extending transversely through the unit at the joined ends of the angulated arms 38 and 39, is a transversely extending shaft 46 which passes through the inner arms 27 and the outer arms 29 and, as shown in Fig. 6, is maintained in position against transverse movement through the arms, by suitable collars 47 or in any other suitable manner. The front rock frame unit is thus mounted for rocking movement on the shaft 46 and as shown, the longer arm 38 extends forwardly and the shorter arm 39 extends downwardly and rearwardly.

The forward ends of the beams 40 making up the arm 38 of the front rock frame unit, are connected together by a suitable transverse bar or beam 48 which may be of channel form and which is provided with a central cable passing opening 49 for the purpose hereinafter set forth.

Secured across the under side of the arm 38 of the front rock frame unit is a fifth wheel plate 50 which carries the pin 20 and this plate is adapted to be slidably run onto the fifth wheel plate 14, carried by the chassis frame 11, whereby to engage the pivot pin 20 in the slot 18, in the conventional manner.

The cross beam or connecting member 48 between the forward ends of the arms 40 carries on its forward face a pulley 51, the top of which is in line with the opening 49 for the purpose hereinafter set forth.

Mounted upon the shaft 46, on the longitudinal center of the load carrier unit, is a sheave or pulley 52 and supported upon a shaft 53 extending transversely of the box 45 between the plates 44, is a cooperating pulley 54, the purpose of which will be hereinafter set forth.

Secured between the lower ends of the arms 27 is a keeper plate 55 which is transversely arcuate and has its center of curvature struck from the axis of the shaft 46. The free end of the downwardly directed arm 39 is located close to the concave side of this plate and swings across the same as the rock frame unit oscillates in the up and down movement of the load carrier unit.

The keeper plate 55 has formed therethrough the two spaced openings 56 and 57, the spacing of which is transversely of the plate as shown in Fig. 7.

As is also shown in Fig. 7, the lower plate 43 of the box 45 carries two longitudinally spaced guides 58 and through these guides is slidably extended a locking tongue 59 which is adapted for selective engagement in the keeper openings 56 or 57.

An actuating rod 60 is loosely connected, as at 61, with the upper end of the tongue 59 and extends upwardly and is loosely connected at its upper end at 62 with a crank 63 carried by a rock shaft 64 which is supported at its ends in the webs of the two arm beams 40. One end of the shaft 64 has a lever 65, see Figs. 4 and 6, by which the rock shaft 64 can be turned to effect the desired reciprocation of the keeper tongue 59 for engagement in or removal from an opening 56 or 57.

Supported between the forward ends of the inner beams 25 adjacent to the angle between these beams and the arms 27 and adjacent to the top edge of the keeper plate 55, is a transverse shaft 66 on which is supported, approximately in the longitudinal central plane of the load carrier unit, a pulley 67.

The numeral 68 generally designates a rear wheel truck structure which comprises a frame or chassis 69 and ground engaging supporting wheels 70.

Supported upon the frame 69 is a plate 71 which carries the transversely spaced upright bearing members 72 each of which carries a laterally extending pivot pin or trunnion 73.

Overlying the plate 71 is a rock unit supporting plate 74 which carries the downwardly extending bearing members 75 each of which is rockably supported upon a trunnion 73.

The rear rock frame unit 23 is of the same form or construction as the front unit 22 and comprises two spaced parallel beams 76 having the downwardly angled converging forward end portions 77, which forward end portions are joined together in the same manner as the downwardly converging portions 41 of the front rock frame unit.

The convergent joined extensions 77 have mounted thereon, or secured thereto, a suitable ring or eye member 78 for the attachment of a pull cable as hereinafter set forth and in line with this eye or ring 78 is a pulley 79 which is supported on a transversely extending shaft 80 mounted between the rear ends of the inner beams 25. Extending across, between and connecting the upper ends of the rearwardly extending arms 28 and the outer arms 30 is the shaft 81 which passes through the forward ends of the rock unit beams 76 in the angle between the same and the convergent portions 77.

The rear ends of the beams 76 are joined together by a cross member 82 and such beams at their rear ends rest upon the plate 74 and are secured thereto by bolts 83 passing through the flanges of the beams 76, or in any other suitable manner.

It will be seen from the foregoing that the rear rock frame unit 23 is supported for vertical oscillation on the axis of the trunnions 73 which extend transversely of the truck. It will also be apparent that the axis of oscillation for the rear unit is parallel with the axis of oscillation for the front unit 22 and since the angled portions 41 and 77 of the units 22 and 23 respectively are directed downwardly and toward one another, that is, the convergent portions 41 of the front unit 22 extend at an angle downwardly and rearwardly, and the convergent portions 77 of the rear unit 23 extend downwardly and forwardly, when these units are oscillated on the transverse axes provided by the pivots 15 for the front unit and the pivots 73 for the rear unit, the raising and lowering of the central load carrier unit 21 will be effected.

It will also be readily apparent that if upward pull is applied to the downwardly angled portions of the front and rear rock units, such angles will swing upwardly on the trunnions carried by the wheeled trucks and the elevating force will be transmitted to the center load carrier unit by means of the shafts 46 and 81.

As previously stated, the present load carrier is designed to be actuated by an operating cable adapted to be attached at one end, for winding up, to a power operated winch, not shown, carried by the tractor truck. Such operating cable is here generally designated 85 and is illustrated in Fig. 4 as having a suitable ring 86 attached to its forward end to facilitate its connection with the winding winch. When so attached, the cable extends rearwardly from the winch across the top of the pulley 51 and over the pulley 52 carried on the shaft 46 from where it passes downwardly to and under the pulley 54, which is supported at the lower angled portion or arm 39 and then upwardly and rearwardly across the top of the pulley 67 from where it continues rearwardly across the under side of a centrally located pulley 87 which is supported beneath the cross beams 32. From the pulley 87 beneath which the cable 85 runs, the cable continues rearwardly across the top of the pulley 79 and is secured at the eye 78 carried by the downwardly extending arm of the rear rock unit 23, which arm is comprised of the downwardly converging joined extensions 77 of the beam 76.

At a suitable location forwardly of the pulley 87, the cable has connected thereto, by a clamp 88, or in any other suitable manner, an end of a second cable which is designated 85a and this second cable runs under the pulley 87 around the rear and across the top thereof and extends forwardly over a second pulley 67a carried by the shaft 66 beside the first pulley 67 and is secured at its forward end to an eye or ring 89 attached to the end of the angled arm 39 of the forward rock frame unit as illustrated in Fig. 7.

In Fig. 12, a diagrammatic layout of the cable system is shown and from this diagram it will be seen that when the forward attached end of the cable 85 is wound up on the power truck unit winch, a forward and upward pull will be applied to the unit 23 at the eye 78 and a rearward and upward pull will be applied to the forward unit 22 at the eye 89 through the medium of the second cable 85a which is attached to the main cable 85 at the point 88. When the rock frame units have been oscillated to the approximate position in which they are shown in Fig. 1, that is, where the longer arms of the units are substantially horizontal, the downwardly angled arms of the units will be raised to a position between adjacent arm 27 for the front rock frame unit and the adjacent arms 28 for the rear rock frame unit. When the rock frame units are thus oscillated, it being understood that the locking tongue 59 will be retracted during this action, the tongue can be brought into position to enter the keeper plate aperture 56 so that the centrally located load carrier unit will be secured in the elevated position shown in Fig. 1.

Should it be desirable to raise the central unit to a higher position, a further pull on the cable 85 after retracting tongue 59 from the plate 55, will permit the rock frame units to be further oscillated until the tongue 59 is brought into position for engagement with the keeper plate opening 57, as illustrated in dotted outline in Fig. 4.

The turntable unit 24, which is supported at the center of the load carrier unit, is of substantially the same construction as that illustrated in my prior patent hereinbefore referred to and comprises transverse parallel channel irons 90 arranged with the channels upwardly directed and connected by short intermediate channel irons 91 and 92, the irons 91 being between the ends of the channel irons 90 and the channel iron 92 being midway between the ends and overlying the upwardly directed pivot or bearing socket 33 as shown in Fig. 10. This central channel iron carries on its underside, the downwardly extending pivot pin or stud 93 which seats in the socket 33.

Each of the upwardly opening channel irons 90, 91 and 92 has secured therein a flat timber body designated respectively 94, 95 and 96. These timbers, as shown in Fig. 10, project slightly above the flanges of the angle irons in which they are secured so that a body placed upon the load carrier unit will not come in contact with the iron flanges.

To further strengthen the platform structure the adjacent ends of the transverse channel irons are connected together by steel bars 97.

In order to properly stabilize the turntable 24, suitable supporting rollers 98 are mounted at opposite sides of the load carrier unit on shafts 99 secured between the adjacent side beams 25 and 26, and other rollers 100 are mounted upon supporting shafts 101 positioned between adjacent pairs of the transverse beams 31 and 36, as shown in Fig. 5. These rollers 100 rotate on an axis extending longitudinally of the center of the load carrier unit while the rollers 98 are aligned for rotation on an axis extending transversely of the unit, as clearly shown in Fig. 5, and as is shown in Fig. 3, the channel irons 91 bear upon the side rollers 98 while the channel irons 90 bear upon the central longitudinally spaced rollers 100.

The opposite sides of the turntable unit may be provided with suitable eyes or rings 102 secured to the ends of the bars 97 as shown in Fig. 3 whereby a cable may be connected with a selected side of the turntable to effect rotation of the latter by the winding of the cable on the winch of the motor truck unit or by applying pull to the cable in any other suitable manner.

Fig. 13 illustrates a modified construction wherein there is shown a means for effecting the oscillation of the front and rear rock frame units by fluid power operated units carried upon the load carrier. In this modified arrangement, it will be understood that suitable means is provided for supplying fluid under pressure to the power units by which the front and rear rock frames are oscillated. No such power developing means is here illustrated but use may be made of a control unit such as illustrated in my prior patent hereinbefore referred to, in association with a fluid pump forming a part of the standard equipment of the majority of tractor trucks whereby, by means of the said control unit, the fluid can be transmitted as desired to the fluid power units to be described.

In Fig. 13 there are shown front and rear wheeled trucks designated respectively 150 and 151 which are of the same construction as the hereinbefore described trucks 10 and 68. The front truck 150 is not fully illustrated but it will be understood that this is the motor driven truck of the assembly and is of conventional design and, like the majority of motor driven trucks of this character, is equipped with a fluid power source, not shown, in the form of a fluid pump.

The numeral 153 generally designates the pivotally mounted fifth wheel supporting unit and the numeral 154 generally designates a pivotally mounted plate structure carried upon the rear wheel unit 151 and these units 153 and 154 respectively support the front and rear rock frame units 155 and 156. These rock frame units are of the same construction as the units 22 and 23 and between them is located the center load carrier unit which is generally designated 157.

Since the several units of the modified structure shown in Fig. 13 are identical with corresponding units hereinbefore described, it is not believed that a further detailed description of these units is necessary to an understanding of the application thereto of the power units whereby the rock frame units are oscillated for the raising and lowering of the load carrier unit 157.

In accordance with the modified construction, there are provided forwardly and rearwardly of the transverse center of the load carrier unit 157, suitable horizontal transversely directed pivot shafts or pins 158 and 159. These pivot shafts or pins may be suitably mounted between the inner longitudinal beams of the load carrier unit corresponding to the beam 25, or they may consist of any other suitable pivot means which may be mounted upon a transverse brace beam such, for example, as the cross beams 36 of the first described structure.

The numerals 160 and 161 designate respectively forward and rearward fluid cylinders each of which carries a suitable means at its rear end for coupling it with a cross shaft 158 or 159 whereby the cylinder can have vertical rocking movement. Each of these cylinders 160 and 161 houses a fluid piston, not shown, with which is connected a piston rod 162 or 163, the rod 162 for the forward cylinder 160 being directed forwardly of the structure while the rod 163 is directed rearwardly. These piston rods are on the longitudinal center of the load carrier unit and the forward rod is pivotally secured as at 164 to the free end of the downwardly extending tapered or angulated arm 155a of the front rock frame unit 155, while the piston rod 163 which is directed rearwardly is pivotally attached as at 165 to the free tapered angulated and downwardly extending end of the arm 156a of the rear rock frame unit 156.

The front and rear ends of the piston cylinders 160 and 161 have connected therewith pressure fluid conducting pipes which, for each of the cylinders, are designated 166 and 167 respectively, whereby fluid can be injected simultaneously into corresponding ends of the cylinders while being released from the opposite ends or vice versa to effect the pulling of the arms 155a and 156a upwardly in the direction of the transverse center of the load carrier unit whereby to effect the lifting of the unit 157 or to permit these arms to swing apart and in a downward direction to effect the lowering of the central unit, in an obvious manner.

From the foregoing, it will be seen that the trailer truck structure of the present invention constitutes a material improvement over structure disclosed in the prior patent hereinbefore referred to in that the units coupling the central load carrier unit with the wheeled trucks are so designed as to give greater strength while at the same time reducing the number of individual parts employed. Also, it will be seen that in the present construction, due to the bell crank like form of the front and rear rock units and the manner in which they are connected with the upwardly extending arms at the front and rear ends of the load carrier unit, when the rock units are oscillated to effect the raising of the load carrying unit from the ground, no portion of the rock units projects into the load occupying area of the central unit to form an obstruction to the mounting of a load on such unit.

In addition to the foregoing advantages, it will be seen that by the provision of the pulley and the cable system, the truck trailer structure can be readily operated from any source having a cable winding winch such as a tractor truck on which the winch may be carried or the cable winding power source need not be carried by the tractor truck structure. In either case after the central load carrying unit has been elevated to the desired position, the downwardly extending arm of the forward rock unit can be locked to the plate 55 carried upon the central unit so that it is not necessary to maintain a strain upon the lifting cable while the trailer structure is being moved from place to place.

While the locking plate 55 and tongue 59 have been shown as applied to the forward end of the trailer structure for connecting the front rock frame unit 22 with the central unit 21, it is to be understood that this locking mechanism can be used at the rear or, if desired, such means may be provided for locking both the front and rear rock frame units with the central unit, if desired, thereby giving a stronger locking connection between the three units.

I claim:

1. A tractor trailer structure for connection with and between a tractor truck and a wheeled trailer truck, said structure comprising a central load carrier, a front rock unit having a forwardly extending arm and an angulated rearwardly and downwardly extending arm, a pivot coupling between the front unit adjacent to the joined ends of the arms and the front end of the load carrier for oscillation of the unit on a transverse axis, means for coupling the forward end portion of the forwardly extending arm with the tractor truck for oscillation on a transverse axis, a rear rock unit having a rearwardly extending arm and an angulated forwardly and downwardly extending arm, a pivot coupling between the rear unit adjacent to the joined ends of the arms thereof and the rear end of the load carrier for oscillation on a transverse axis, means for pivotally coupling the rear end portion of the rearwardly extending arm with the wheeled trailer truck for oscillation on a transverse axis, and means carried by said central load carrier and lying below the top thereof and connected with the angulated arms of the front and rear units for applying a simultaneous equalized inward and upward pull thereto to effect oscillation of the units on the axes of the means coupling them with said trucks.

2. The invention according to claim 1, with means carried by the free end of one of said angulated arms for locking connection with the load carrier to secure the rock units and load carrier against relative pivotal movement.

3. The invention according to claim 1, with means for locking one of the rock units to the load carrier to secure said rock units and load carrier against relative pivotal movement, said last means comprising an apertured keeper plate carried by the load carrier and having the free end of the adjacent angulated arm directed toward a face thereof to swing thereacross and a keeper bolt movably carried by said adjacent angulated arm for projection from said free end for engagement in an aperture of said keeper plate.

4. The invention according to claim 1, wherein the last stated means comprises a pulley and cable system carried by the rock units and the load carrier, the cable having a free end adapted for connection to a suitable pulley means such as a winch or the like.

5. A tractor trailer structure for connection with and between a tractor truck and a wheeled trailer truck, said structure comprising a central load carrier, a front rock unit having a forwardly extending arm and an angulated rearwardly and downwardly extending arm, a pivot coupling between the front unit adjacent to the joined ends of the arms and the front end of the load carrier for oscillation of the unit on a transverse axis, means for coupling the forward end portion of the forwardly extending arm with the tractor truck for oscillation on a transverse axis, a rear rock unit having a rearwardly extending arm and an angulated forwardly and downwardly extending arm, a pivot coupling between the rear unit adjacent to the joined ends of the arms thereof and the rear end of the load carrier for oscillation on a transverse axis, means for pivotally coupling the rear end portion of the rearwardly extending arm with the wheeled trailer truck for oscillation on a transverse axis, and means connected with the angulated arms of the front and rear units for applying an upward pull thereto to effect oscillation of the units on the axes of the means coupling them with said trucks, said last means comprising sheaves supported upon the front and rear ends of the load carrier for rotation on axes extending transversely thereof, a sheave carried at the free end of the downwardly and rearwardly extending arm of the front rock unit, a sheave rotatably supported adjacent to the transverse center of the load carrier for turning on a transverse axis, a pull cable extending longitudinally of the front rock unit and passing rearwardly under the arm carried sheave and over the top of the adjacent one of the said sheaves on the front end of the load carrier, said cable then passing rearwardly to and around the centrally located sheave and then extending forwardly and being secured to the said free end of the said arm of the front rock unit and a cable secured at one end to the free end of the downwardly and forwardly extending arm of the rear rock unit and extending upwardly and forwardly over the adjacent sheave on the rear end of the load carrier and having its other end secured to the first cable forwardly of the centrally positioned sheave between the latter and the sheave carried on the front end of the load carrier.

6. A tractor trailer structure for connection with and between a tractor truck and a wheeled trailer truck, said structure comprising a central load carrier, a front rock unit having a forwardly extending arm and an angulated rearwardly and downwardly extending arm, a pivot coupling between the front unit adjacent to the joined ends of the arms and the front end of the load carrier for oscillation of the unit on a transverse axis, means for coupling the forward end portion of the forwardly extending arm with the tractor truck for oscillation on a transverse axis, a rear rock unit having a rearwardly extending arm and an angulated forwardly and downwardly extending arm, a pivot coupling between the rear unit adjacent to the joined ends of the arms thereof and the rear end of the load carrier for oscillation on a transverse axis, means for pivotally coupling the rear end portion of the rearwardly extending arm with the wheeled trailer truck for oscillation on a transverse axis, and means connected with the angulated arms of the front and rear units for applying an upward pull thereto to effect oscillation of the units on the axes of the means coupling them with said trucks, said last means comprising a fluid power unit carried by the load carrier at each end and disposed longitudinally and beneath the top thereof, each of said power units comprising a fluid cylinder and piston, means by which fluid under pressure may be introduced into and withdrawn from each cylinder at opposite sides of the piston therein, and an operative coupling between each piston and the free end of the angulated portion of the adjacent rock unit whereby movement of each piston in one direction will effect upward swinging of the said portion of the adjacent rock unit.

7. A tractor trailer structure for connection with and between a tractor truck and wheeled trailer truck, said structure comprising a central load carrier, a front rock unit having a forwardly extending arm and an angulated rearwardly and downwardly extending arm, a pivot coupling between the front unit adjacent to the joined ends of the arms and the front end of the load carrier for oscillation of the unit on a transverse axis, means for coupling the forward end portion of the forwardly extending arm with the tractor truck for oscillation on a transverse axis, a rear rock unit having a rearwardly extending arm and an angulated forwardly and downwardly extending arm, a pivot coupling between the rear unit adjacent to the joined ends of the arms thereof and the rear end of the load carrier for oscillation on a transverse axis, means for pivotally coupling the rear end portion of the rearwardly extending arm with the wheeled trailer truck for oscillation on a transverse axis, and means connected with the angulated arms of the front and rear units for applying an upward pull thereto to effect oscillation of the units on the axes of the means coupling them with said trucks, the forwardly extending arm of the front rock unit, and the rearwardly extending arm of the rear rock unit comprising two spaced parallel beams and the angulated arm of each of said units comprising two beams extending in downward converging relation from their respective parallel beams and joined at their convergent ends, and a cross coupling beam between the free ends of each two parallel beams.

8. The invention according to claim 7, with a pair of arms extending upwardly and forwardly from the central load carrier, said front rock unit having the angulated arm thereof between said pair of arms, a pair of arms extending upwardly and rearwardly from the central load carrier, and said rear rock unit having the angulated arm thereof located between the last named pair of arms.

9. A tractor trailer structure for connection with and between a tractor truck and a wheeled trailer truck, said structure comprising a central part embodying a pair of joined together spaced longitudinal beams and upwardly directed divergently related arms at its ends, the adjacent arms of the beams forming forward and rear cooperating pairs, a front rock unit comprising a long forwardly and upwardly directed leg and an obliquely angled downwardly and rearwardly directed leg extending from one end of the long leg, said unit being pivotally mounted adjacent to the said one end of the long leg between and on the forward pair of arms to rock on a transverse axis, a rear rock unit comprising a long rearwardly and upwardly directed leg and an obliquely angled downwardly and forwardly directed leg extending from one end of the long leg, said rear unit being pivotally mounted adjacent to the said one end of the long leg between and on the rear pair of arms to rock on a transverse axis, each of said obliquely angled legs embodying a pair of downwardly convergent beams coupled together at their convergent ends, the coupling between the convergent ends of the front unit beams forming a box having forward and rear open ends, means for coupling the long legs of the front and rear units respectively with the tractor truck and the trailer truck for oscillation each on a transverse axis, and a cable and pulley system for rocking the units to raise and lower said beams and arms comprising pulleys supported at and between the front and rear ends of the parallel beams each adjacent to the free end of the adjacent angled leg and a pulley mounted between the parallel beams between the pair of pulleys, a guide pulley mounted in the open rear end of said box, a pull cable extending longitudinally of the front rock unit between the convergent beams of the angled leg thereof to and through said box and passing under the guide pulley and then across the top of the adjacent parallel beam supported pulley, the cable then passing around the intermediate pulley and then forwardly and having one end secured to the end of the forward angled arm, and a cable secured at one end to the free end of the angled arm of the rear rock unit and passing across the top of the adjacent parallel beam supported pulley and having its other end secured to the first cable forwardly of said intermediate pulley, and said pull cable having means upon its other end for connection with a pulling means.

10. The invention according to claim 9, with means for locking the units to the said central part comprising an apertured plate secured between the forward ends of the parallel beams in position to have the free end of the adjacent angled arm brought into opposed relation therewith, and a lock bolt carried by the last mentioned free end for engagement in an aperture of the plate.

References Cited in the file of this patent
UNITED STATES PATENTS

| | | |
|---|---|---|
| 1,603,821 | Watters | Oct. 19, 1926 |
| 2,174,415 | Curtis | Sept. 26, 1939 |
| 2,653,827 | Manning | Sept. 29, 1953 |